United States Patent [19]
Fukuda

[11] Patent Number: 5,995,844
[45] Date of Patent: Nov. 30, 1999

[54] WIRELESS TELEPHONE SYSTEM

[75] Inventor: Kunio Fukuda, Tokyo, Japan

[73] Assignee: Sony Coporation, Tokyo, Japan

[21] Appl. No.: 08/879,768

[22] Filed: Jun. 20, 1997

[30]     Foreign Application Priority Data

Jun. 25, 1996   [JP]   Japan ................................... 8-184180

[51] Int. Cl.$^6$ .............................. H04Q 7/20; H04Q 7/32;
                                        H04Q 7/30; H04Q 7/38
[52] U.S. Cl. .......................... 455/462; 455/465; 455/403
[58] Field of Search .................................... 455/462, 465,
                                                    455/460, 403

[56]              References Cited

U.S. PATENT DOCUMENTS 5,583,854  12/1996  Beesley .................................... 370/278
5,715,295   2/1998  Yamashita ............................... 455/455
5,737,325   4/1998  Fukuda .................................... 370/337

FOREIGN PATENT DOCUMENTS

WO 94/05101  3/1994  WIPO .............................. H04Q 7/00

*Primary Examiner*—Dwayne D. Bost
*Assistant Examiner*—Alan Gantt
*Attorney, Agent, or Firm*—Jay H. Maioli

[57]              ABSTRACT

In a wireless telephone system, a wireless section of the base station for informing talking mobile wireless terminals of a connection request through a first frequency and for transmitting/receiving control data to a mobile wireless terminal which is in a reception waiting state through a second frequency during talking between the mobile wireless terminals is further simply constituted. Synchronous information is transmitted from the base station through the first frequency, and the first and the second mobile wireless terminals which have received the synchronous information perform a bi-directional and direct talking in a synchronized manner with the base station on the basis of the synchronous information. In this way, the base station is able to ensure a free period which is allocated to switching of the oscillation frequency of a frequency-selecting oscillators and to transmission/reception of the control data by using the second frequency, in addition to a period for transmitting the synchronous information through the first frequency.

6 Claims, 6 Drawing Sheets

WIRELESS TELEPHONE SYSTEM

BACKGROUND OF THE INVENTION

1. Field of the Invention

This invention relates to a wireless telephone system, and more particularly, is suitably applied to a digital cordless telephone system in which plural portable units are registered at a base unit to communicate between the base unit and the portable unit or between the portable units.

2. Description of the Related Art

As this type of a digital cordless telephone system, there is a personal handyphone system (PHS) scheme wherein wireless communication is performed between a base unit connected to a public telephone network with a wire and portable units or between the portable units in accordance with a time division multiple access (TDMA) scheme. In the PHS-scheme digital cordless telephone system, extension communication is performed between the plural portable units registered at the base unit or between the base unit and the portable units, and communication is performed between the portable unit and a telephone connected to a public telephone network, that is, an outside line.

On the TDMA scheme in the PHS-scheme digital cordless telephone system, the time base is divided into 5 [ms] frames. The respective frames are divided into a total of eight time slots, that is, continuous four transmission time slots and continuous four reception time slots. The duration of each time slot is 625 [μs].

In the PHS-scheme digital cordless telephone system, by using one transmission time slot in one frame on the base unit side and using one reception time slot on the portable unit side, digital data which is comprised of physical slots having the stated number of bits is transmitted from the base unit to the portable unit through a certain frequency. Besides, in the PHS-scheme digital cordless telephone system, by using one transmission time slot in one frame on the portable unit side and using one reception time slot on the base unit side, the digital data which is comprised of the physical slots having the stated number of bits is transmitted from the portable unit to the base unit through the same frequency as the aforementioned frequency.

The PHS-scheme digital cordless-phone system causes the portable units which are in a reception waiting state to intermittently receive only control data which is transmitted from the base unit, so that power consumption of the portable units in this state is decreased. That is, the base unit transmits the control data to the respective portable units by using 625 [μs] for each 125 [ms], that is, by using one time slot for each two hundred time slots. At this time, the base unit transmits the control data intermittently using a dedicated frequency (hereinafter, referred to as a control carrier).

On the other hand, the respective portable units in a reception waiting state receive only the control data transmitted using the control carrier, once for each stated period, for instance, once for every one or two seconds.

When a request to connect has occurred, the base unit transmits an individual number of a called-side portable unit by means of the control data, so as to call up the portable unit having the individual number within one or two seconds. After the portable unit has been called up, the base unit discriminates the contents of the connection request, such as a calling or reception to/from the outside line, extension communication with the base unit, and extension communication with another portable unit, and then assigns the portable unit a time slot for transmission/reception of voice data and an arbitrary communication frequency (hereinafter, referred to as a communication carrier) excepting a frequency for a direct talk between portable units.

Thereby, the respective portable units in a reception waiting state are not needed to operate in a mode of always searching, for instance, ten communication carriers for a direct talk between portable units, and to check whether or not a call for extension communication between portable units exists. Therefore, the respective portable units receive only the control data transmitted from the base unit using the control carrier, so that the power consumption in a reception waiting state is decreased considerably in comparison with that of continuous reception and the portable unit communicates with the base unit or with another portable unit via the base unit.

Figures 1A, 1B:
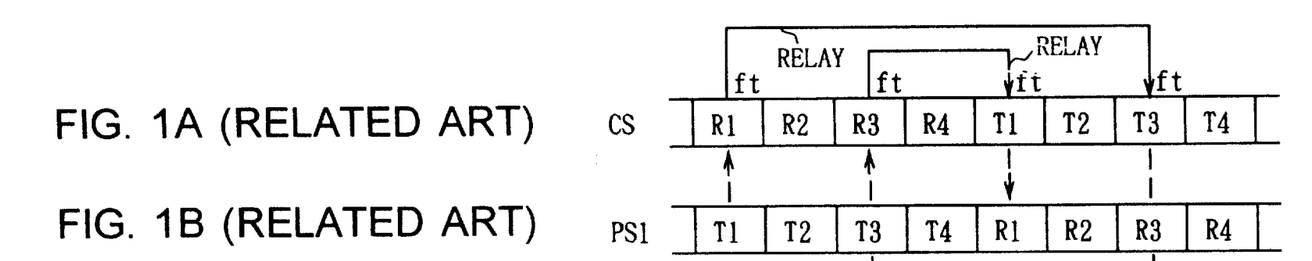
FIGS. 1A to 1C are timing charts explaining timings of transmission and reception of a communication carrier when portable units talk each other via a conventional base unit.
Figure 1C:
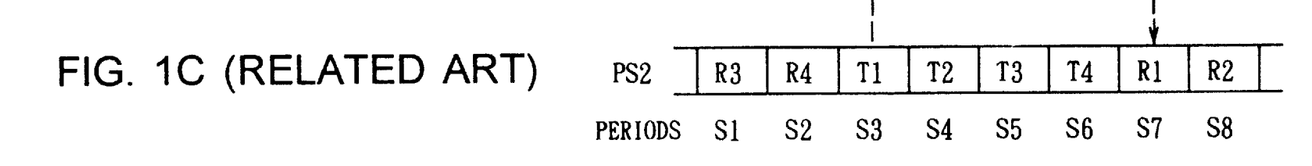

Here, as shown in FIGS. 1A to 1C, the state will be described wherein, after a base unit CS which accommodates two time slots transmits the control data through the control carrier to assign the transmission/reception time slots and the communication carrier of the frequency ft, the base unit relays communication between portable units PS1 and PS2, where T1 to T4 are transmission time slots and R1 to R4 are reception time slots. The base unit which accommodates two time slots comprises only one oscillator for selecting a frequency (wireless channel) in its wireless section, and switches the oscillation frequency so as to generate the communication carrier of the arbitrary frequency.

As shown in FIG. 1B, the portable unit PS1 transmits digital voice data to the base unit CS by using the communication carrier of the frequency ft at the transmission time slot T1 of the period S1. As shown in FIG. 1A, the base unit CS receives the voice data at the reception time slot R1 of the period S1, and then transfers the voice data to the portable unit PS2 at the transmission time slot T3 of the period S7 by using the communication carrier of the frequency ft. As shown in FIG. 1C, the portable unit PS2 receives the voice data at the reception time slot R1 of the period S7, and causes the time slot to be synchronized.

On the other hand, the portable unit PS2 transmits voice data to the base unit CS by using the communication carrier of the frequency ft at the transmission time slot T1 of the period S3. As shown in FIG. 1A, the base unit CS receives the voice data at the reception time slot R3 of the period S3, and then transfers the voice data to the portable unit PS1 at the transmission time slot T1 of the period S5 by using the communication carrier of the frequency ft. As shown in FIG. 1B, the portable unit PS1 receives the voice data at the reception time slot R1 of the period S5, and causes the time slot to be synchronized.

In this manner, the portable units PS1 and PS2 mutually transmit and receive the respective voice data via the base unit so as to cause the time slots to be synchronized, so that communication between the portable units is performed.

However, in the case where the aforementioned digital cordless telephone system has a portable unit PS3 in addition to portable units, there has been such a problem that the base unit CS is not able to transmit, during talking between the portable units PS1 and PS2, the control data to the portable unit PS3 by using the control carrier of frequency that is different from that of the communication carrier ft, before the talking between the portable units PS1 and PS2 is terminated.

As a result, such a trouble has occurred that the other portable unit, for instance, PS3 in a reception waiting state can not receive the control data using the control carrier from the base unit CS during the talk between the portable units SP1 and SP2, and it is put out of the speakable zone. Besides, even if a connection request based on outside line communication, extension communication, a door-phone, etc. has occurred, the base unit CS has not been able to inform the portable unit SP3 in a reception waiting state that the connection request has occurred.

Figure 2A:
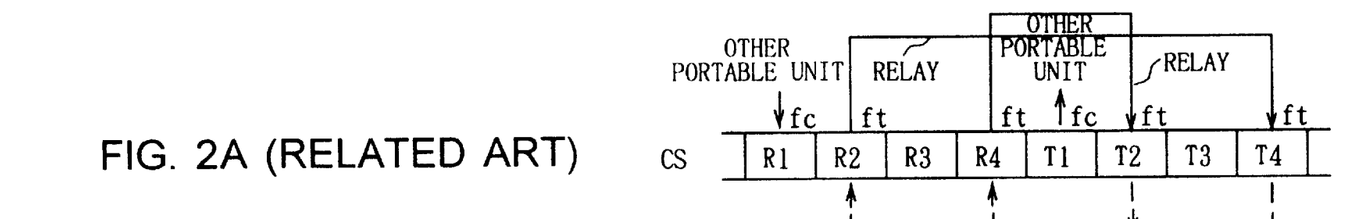
FIGS. 2A to 2C are timing charts explaining timings of transmission and reception of the communication carrier and a control carrier when the portable units talk each other via the conventional base unit.
Figure 2B:
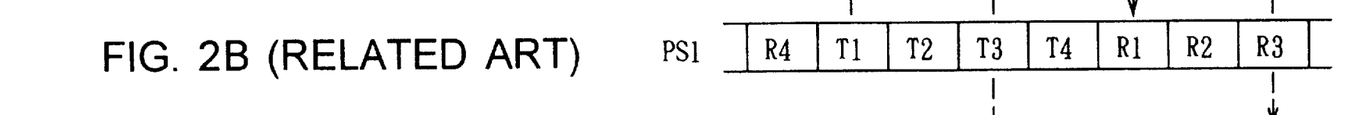
Figure 2C:
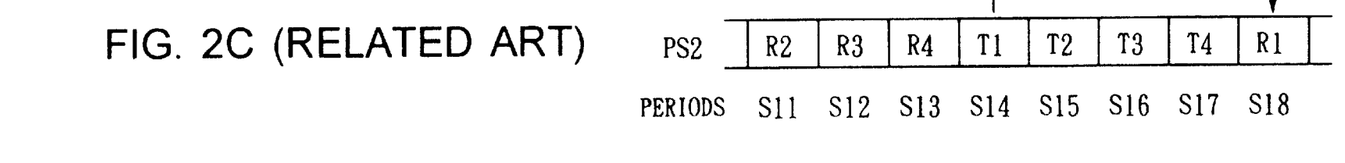

In order to solve these problems, it may be considered that a base unit CS which accommodates three time slots transmits the control data by using the control carrier during the talk between the portable units. That is, as shown in FIG. 2B, the portable unit PS1 transmits voice data to the base unit CS by using the communication carrier of the frequency ft at the transmission time slot T1 of the period S12. As shown in FIG. 2A, the base unit CS receives the voice data at the reception time slot R2 of the period S12, and then transfers the voice data to the portable unit PS2 by using the communication carrier of the frequency ft at the transmission time slot T4 of the period S18. As shown in FIG. 2C, the portable unit PS2 receives the voice data at the reception time slot R1 of the period S18, and causes the time slot to be synchronized.

On the other hand, the portable unit PS2 transmits voice data to the base unit CS by using the communication carrier of the frequency ft at the transmission time slot T1 of the period S14. As shown in FIG. 2A, the base unit CS receives the voice data at the reception time slot R4 of the period S14, and then transfers the voice data to the portable unit PS1 by using the communication carrier of the frequency ft at the transmission time slot T2 of the period S16. As shown in FIG. 2B, the portable unit PS1 receives the voice data at the reception time slot R1 of the period S16.

As shown in FIG. 2A, in addition to relaying the voice data of the portable units PS1 and PS2, the base unit CS transmits control data which is directed to the portable units, so-called down control data, to another portable unit by using a communication carrier of a frequency fc at the transmission time slot T1 of the period S15. Besides, at the reception time slot R1 of the period S11, the base unit CS receives up control data which has been transmitted from the other portable unit to the base unit by using the control carrier of the frequency fc.

In this connection, the control data is transmitted and received once for each 125 [ms] (25 frames) as described above.

In this manner, the base unit CS becomes capable of transmitting/receiving the control data to the portable unit PS3, as well as relaying the voice data of the portable units PS1 and PS2, owing to the use of three time slots. However, in this state, pairs of such time slots are produced that are neighboring and their frequencies differ from each other, such as the reception time slots R1 and R2, the reception time slot R4 and the transmission time slot T1, and the transmission time slots T1 and T2.

Figure 3:
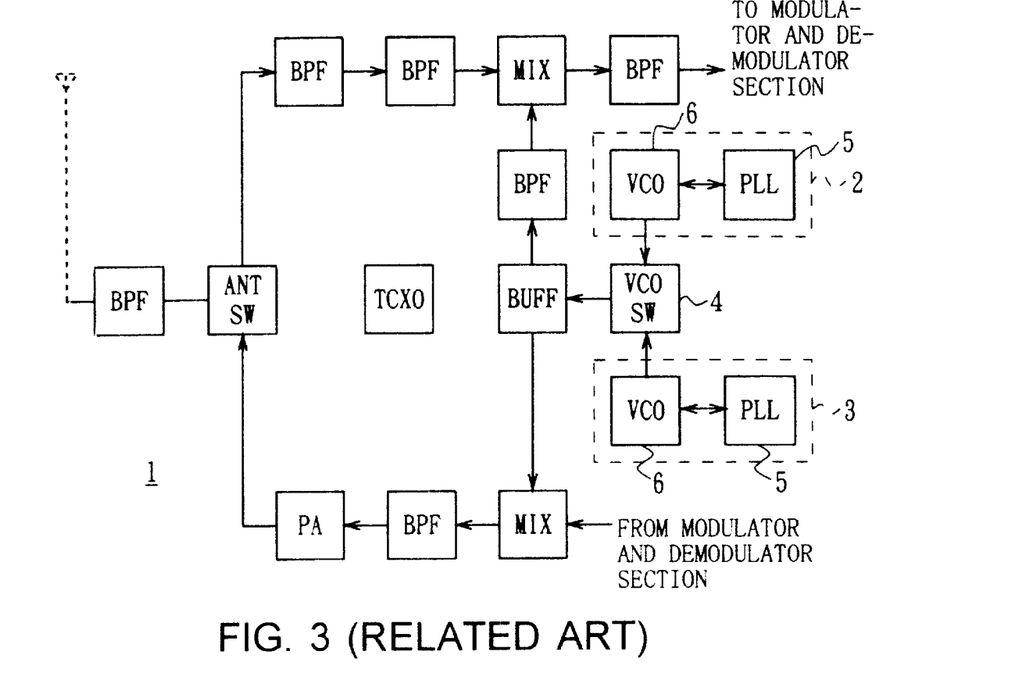
FIG. 3 is a block diagram showing a constitution of a wireless section of the conventional base unit.

However, when it is tried to obtain the frequencies fc and ft by switching the oscillation frequency of a single oscillator for frequency selection, it is hard to ensure waiting time for stabilization of the frequency after switching. Therefore, as shown in FIG. 3, it has been the only way that a wireless section 1 of the aforementioned conventional base unit CS which accommodates three time slots is provided with two frequency-selecting oscillators 2 and 3, and the two oscillators 2 and 3 are switched alternately by a VCO switch 4 so as to obtain the frequencies fc and ft. Therefore, such a problem has existed that the constitution of the wireless section of the base unit CS is complicated.

In this connection, the frequency-selecting oscillators 2 and 3 have been composed into frequency synthesizers, each of which has a phase locked loop (PLL) 5 and a voltage controlled oscillator (VCO) 6.

SUMMARY OF THE INVENTION

In view of the foregoing, an object of this invention is to provide a wireless telephone system which enables a simple constitution of a wireless section of a base station, during talking between mobile wireless terminals, for informing the talking mobile wireless terminal of a connection request through a first frequency and transmitting/receiving control data to a mobile wireless terminal in a reception waiting state through a second frequency.

The foregoing object and other objects of the invention have been achieved by the provision of a wireless telephone system which has a base station connected to a public telephone network and plural mobile wireless terminals to communicate with the base station, for communicating stated data between the mobile wireless terminals, wherein in the case where bidirectional communication is performed between a first mobile wireless terminal and a second mobile wireless terminal out of the plural mobile wireless terminals, the base station transmits synchronous information to the first and second mobile wireless terminals, and causes the first and second mobile wireless terminals to synchronize with the base station on the basis of the transmitted synchronous information. Besides, the first mobile wireless terminal transmits first data directly to the second mobile wireless terminal. Besides, the second mobile wireless terminal transmits second data directly to the first mobile wireless terminal.

The synchronous information is transmitted from the base station through a first frequency, and the first and second mobile wireless terminals which have received the synchronous information communicate directly and mutually by synchronizing with the base station on the basis of the synchronous information. In this way, the base station can ensure a free period which is allocated to switching of the oscillation frequency of the frequency-selecting oscillators and to transmission/reception of control data through a second frequency, in addition to a period for transmitting the synchronous information through the first frequency. Accordingly, during talking between the mobile wireless terminals, the wireless section of the base station is simplified for informing the talking mobile wireless terminals of a connection request through the first frequency and for transmitting/receiving the control data to a mobile wireless terminal in a reception waiting state through the second frequency.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 4:
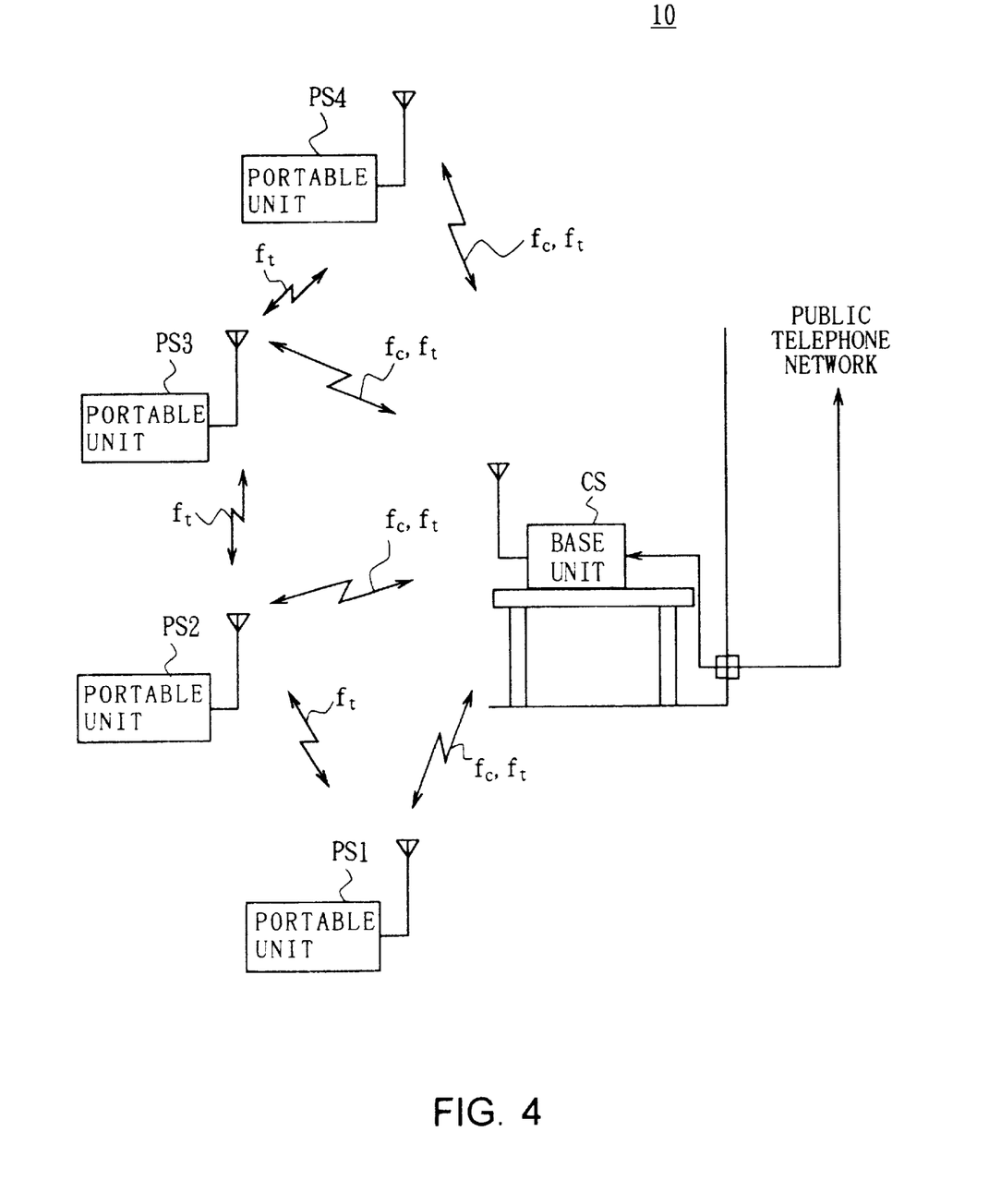
FIG. 4 is a schematic diagram illustrating an embodiment of a wireless telephone system according to the present invention.

Preferred embodiments of this invention will be described with reference to the accompanying drawings:

In FIG. 4, numeral 10 generally shows a PHS-scheme digital cordless telephone system as a wireless telephone system. In the PHS-scheme digital cordless telephone system 10, a base unit CS of the PHS-scheme as a base station is connected to a public telephone network, and plural portable units PS of the PHS-scheme as mobile wireless terminals are registered at the base unit CS.

The base unit CS relays voice data for talking between the portable units PS by using a communication carrier of a frequency ft. Besides, the base unit CS transmits/receives control data intermittently by using a control carrier of a frequency fc.

The portable units PS communicate with each other by using the communication carrier of the frequency ft which has been assigned by the control data of the base unit CS.

Figure 5:
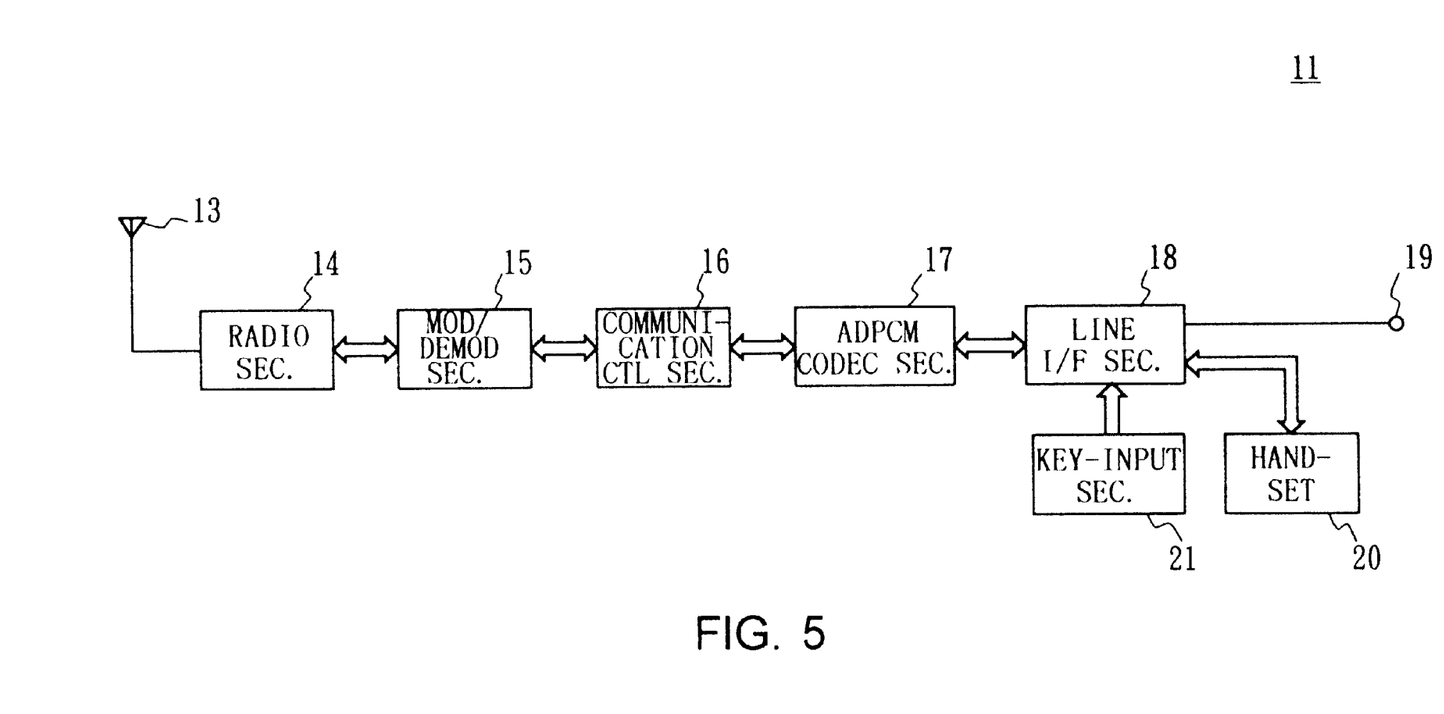
FIG. 5 is a block diagram showing a constitution of a base unit which is used in a PHS-scheme digital cordless telephone system of the embodiment.

As shown in FIG. 5, when a call is issued to the public telephone network from a portable unit PS, in the base unit CS, a wireless section 14 performs reception processing on a high-frequency signal obtained by receiving a radio wave transmitted from the portable unit PS with an antenna 13, and then supplies it to a modulator and demodulator section 15 to demodulate the reception data. The modulator and demodulator section 15 supplies the demodulated reception data to an adaptive differential pulse code modulation (ADPCM) codec section 17 via a communication control section 16. The ADPCM codec section 17 produces an analog audio signal from the received ADPCM digital data and then supplies the audio signal to a line interface section 18. The line interface section 18 sends the audio signal toward the public telephone network via an analog telephone line connecting terminal 19.

When a call has been arrived from the public telephone network, the base unit CS supplies an audio signal obtained from the public telephone network to the line interface section 18 via the analog telephone line connecting terminal 19. The line interface section 18 supplies the voice data to the ADPCM codec section 17 to convert the data into ADPCM digital data, and then the digital data is supplied to the modulator and demodulator section 15 via the communication control section 16. The modulator and demodulator section 15 produces a modulation signal corresponding to the digital data, and supplies the modulation signal to the wireless section 14. The wireless section 14 modulates the communication carrier of the frequency ft with the modulation signal to produce a modulated signal having a high frequency, and then wireless-transmits the modulated signal from the antenna 13.

The base unit CS supplies an audio signal produced in a hand-set 20 in response to the received voice and control information produced in a key-input section 21 in response operations, to the line interface section 18.

Accordingly, the base unit CS can communicate with another telephone by sending the audio signal based on the hand-set 20 to the public telephone network via the analog telephone line connecting terminal 19, and can extension-communicate with a portable unit PS by supplying the audio signal based on the hand-set 20 to the ADPCM codec section 17.

Figure 6:
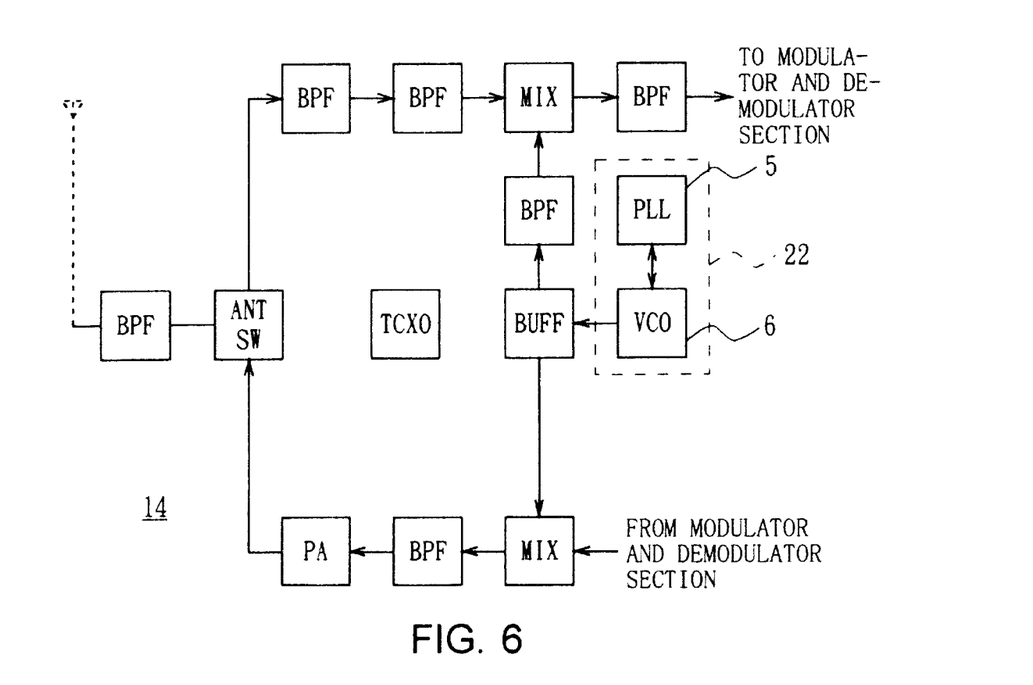
FIG. 6 is a block diagram showing a constitution of the wireless section of the base unit in FIG. 5.

As shown in FIG. 6, in the wireless section 14 of the base unit CS, an oscillator for frequency-selecting is comprised of one frequency synthesizer 22 having a PLL 5 and a voltage controlled oscillator 6. The wireless section 14 uses the frequency synthesizer 22 for transmission along with reception. The wireless section 14 shifts an oscillation frequency which is produced in the frequency synthesizer 22 at stated frequency intervals, to produce the control carrier and the communication carrier.

The communication control section 16 controls the wireless section 14 so as to cause it to transmit the control data using the control carrier in the stated transmission time slot, and calls up a portable unit PS. Besides, in a reception waiting state, the communication control section 16 detects whether or not a connection request signal has been transmitted from the portable unit PS.

For instance, in the case where a portable unit PS1 transmits the connection request signal to request a talk with the base unit CS, the communication control section 16 transmits the control data by using the control carrier to assign the communication carrier, the time slot, and so on to the calling-side portable unit PS1.

Thereby, the base unit CS can cause the portable unit PS1 to start the communication for talking with the base unit CS.

For instance, in the case where a portable unit PS2 transmits the connection request signal to request a talk with the portable unit PS1, the communication control section 16 transmits the control data by using the control carrier to assign the communication carrier, the time slot, and so on to the calling-side portable unit PS2.

Thereby, the base unit CS can cause the portable unit PS2 to start the communication for a talk which the base unit CS relays.

Sequentially, the communication control section 16 transmits the control data to the called-side portable unit PS1 by using the control carrier to assign the connection request signal which indicates to start talking with the portable unit PS1, the communication carrier for a direct talk between portable units, the time slot, and so on to the portable unit PS2.

Accordingly, the base unit CS can cause the called-side portable unit PS1 to start the communication for directly talking from the called-side portable unit PS1 to the calling-side portable unit PS2 in one-way direction.

Figure 7:
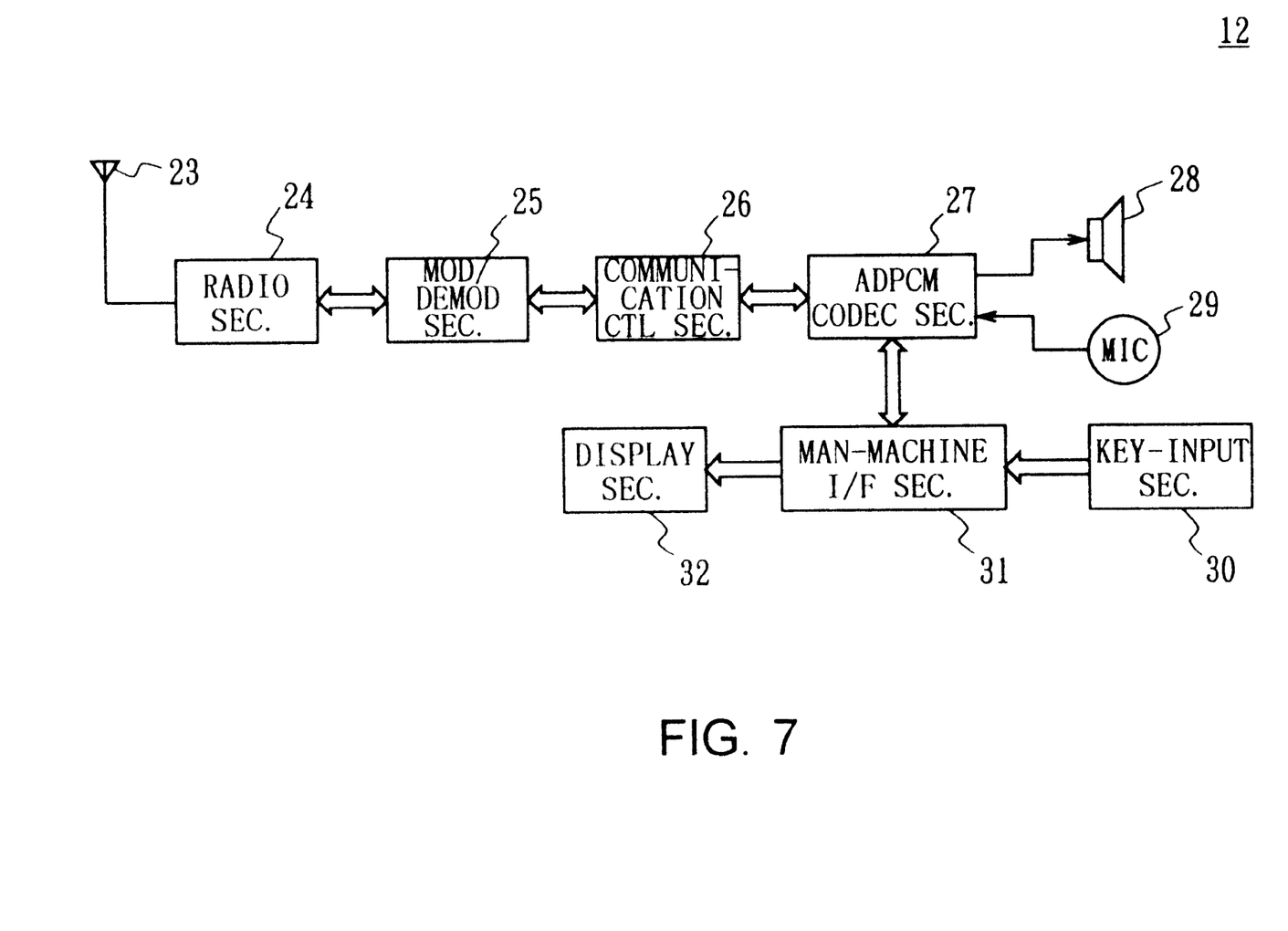
FIG. 7 is a block diagram showing a constitution of a portable unit which is used in the PHS-scheme digital cordless telephone system of the embodiment.

As shown in FIG. 7, in one of the portable units PS, an antenna 23 receives a radio wave transmitted from the base unit CS or another portable unit PS, and then a wireless section 24 performs reception processing on the received high-frequency signal and supplies it to a modulator and demodulator section 25 to demodulate the reception data. The modulator and demodulator section 25 supplies the demodulated reception data to an ADPCM codec section 27 via a communication control section 26. The ADPCM codec section 27 produces an audio signal from the received ADPCM digital data, and then supplies the audio signal to a speaker 28 so as to cause it to output the voice.

The portable unit PS receives a voice with a microphone 29 to produce an audio signal in response to the voice, and then supplies the audio signal to the ADPCM codec section 27. The ADPCM codec section 27 converts the audio signal into an ADPCM digital data, and supplies the digital data to the modulator and demodulator section 25 via the communication control section 26. The modulator and demodulator section 25 produces a modulation signal responding to the digital data, and gives the modulation signal to the wireless section 24. The wireless section 24 modulates the communication carrier with the modulation signal to produce a modulated signal of high frequency, and then causes the antenna 23 to wireless-transmit the modulated signal.

The portable unit PS gives the communication control section 26 the control information which has been produced in a key-input section 30 in response to the operation, via a man-machine interface section 31 and the ADPCM codec section 27. At this time, the man-machine interface section 31 displays the control information, the operational state, and others, on a display screen (not shown) of a display section 32.

At the time of a reception waiting state, the communication control section 26 controls the reception operation to intermittently receive only the control data, which has been transmitted from the base unit CS by using the control carrier, at the stated intervals.

Therefore, the portable unit PS can decrease the power consumption at the time of the reception waiting state.

The communication control section 26 discriminates the contents of the received control data, and when it is judged that it is being called with the connection request signal which is included in the control data, it starts the communication for a talk.

In the case where the portable unit PS makes a call for outside line communication or extension communication (with the base unit CS or the portable unit PS), the communication control section 26 transmits the connection request signal and the control data including the individual number of the called-side portable unit PS or the telephone number of the outside line side, to the base unit CS by using the control carrier.

Figure 8A:
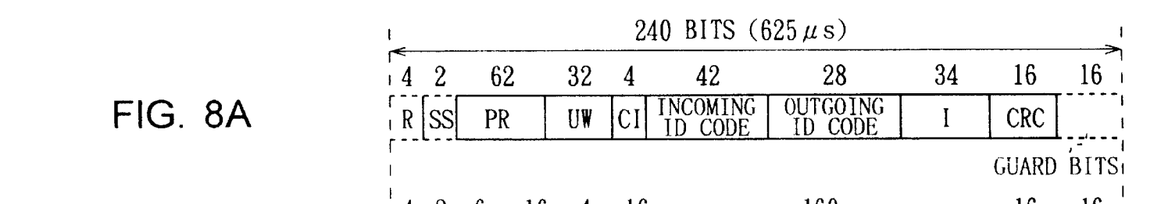
FIG. 8A to 8B are schematic diagrams showing constitutions of physical slots for control and communication.
Figure 8B:
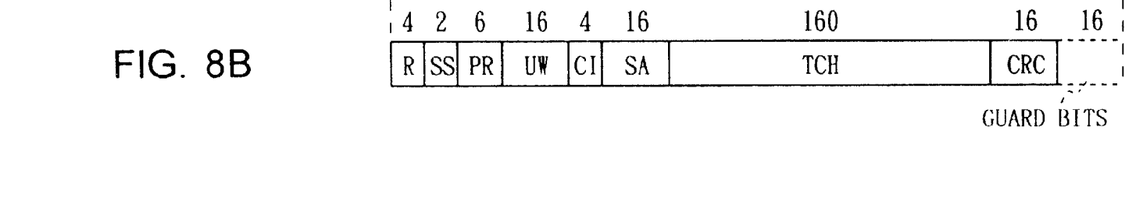

The transmission and reception of the control data is performed by using a physical slot for control. The transmission and reception of the voice data is performed by using a physical slot for communication. The physical slot for control and the physical slot for communication shown in FIGS. 8A and 8B are composed of 240 bits respectively, and transmitted in 625 [µs] which is a period of one time slot.

The physical slot for control is composed in such a manner that, for instance, a ramp bit R, a start symbol SS, a preamble PR, a unique word UW, a channel identification code CI, an incoming identification code, an outgoing identification code, a control data I, an error checking parity CRC, and a guard bit are sequentially placed into 4, 2, 62, 32, 4, 42, 28, 34, 16, and 16 bits respectively.

The physical slot for communication is composed in such a manner that, for instance, the ramp bit R, the start symbol SS, the preamble PR, the unique word UW, the channel identification code CI, a low-speed attached channel SACCH (denoted by SA, in the figure), a voice data TCH, the error checking parity CRC, and the guard bit are sequentially placed into 4, 2, 6, 16, 4, 16, 160, 16, and 16 bits respectively.

Figure 9A:
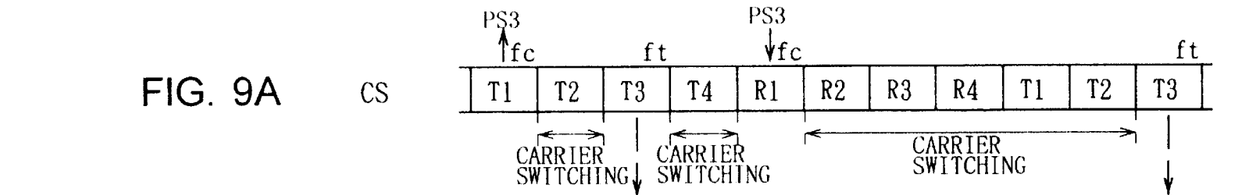
FIGS. 9A to 9D are timing chart explaining the timing of transmission and reception using the communication carrier and the control carrier when the portable units of the embodiment talk each other bi-directionally.

Here, operations of the base unit CS and the portable units PS1 and PS2 which are in a state of directly communication between the portable units PS1 and PS2 will be described. As shown in FIG. 9A, the base unit CS transmits dummy data in which the synchronous information have been entered, to the portable units PS1 and PS2 by using the communication carrier of the frequency ft which is a first frequency, at the transmission time slot T3 of the period S23 and the transmission time slot T3 of the period S31. The dummy data, which is comprised of the physical slot for communication, does not transmit the ordinary voice data TCH.

Figures 9B, 9C:
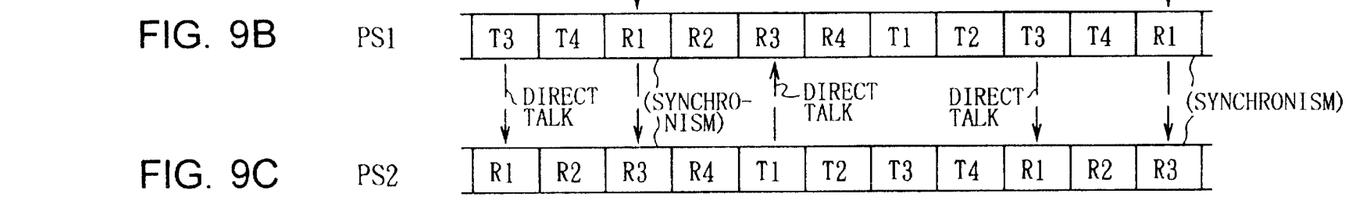
Figure 9D:
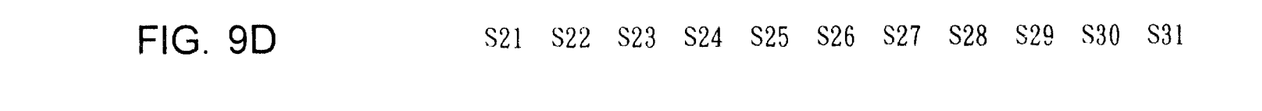

As shown in FIG. 9B, the calling-side portable unit PS1 receives the dummy data transmitted from the base unit CS, at the reception time slot R1 of the periods S23 and S31.

Therefore, the calling-side portable unit PS1 can synchronize the time slot with the time slot of the base unit CS.

Similarly, as shown in FIG. 9C, the called-side portable unit PS2 receives the dummy data transmitted from the base unit CS at the reception time slot R3 of the periods S23 and S31.

Therefore, the called side portable unit PS2 can synchronize the time slot with the time slot of the base unit CS.

In this state, the calling-side portable unit PS1 and the called-side portable unit PS2 directly transmit and receive the voice data with each other. That is, as shown in FIG. 9B, the portable unit PS1 directly transmits the voice data to the portable unit PS2 by using the communication carrier for a direct talk between portable units, at the transmission time slot T3 of the periods S21 and S29. As shown in FIG. 9C, the portable unit PS2 receives the voice data at the reception time slot R1 of the periods S21 and S29.

The portable unit PS2 directly transmits the voice data to the portable unit PS1 by using the communication carrier for a direct talk between portable units, at the transmission time slot T1 of the period S25. As shown in FIG. 9B, the portable unit PS1 receives the voice data at the reception time slot R3 of the period S25. The portable units PS1 and PS2 periodically receive the aforementioned dummy data which is transmitted from the base unit CS, and repeatedly synchronize the time slot with the time slot of the base unit CS, until the talking is ended.

In this way, the portable units PS1 and PS2 can easily correct a deviation of synchronism of the time slots which will occur during the period from the time they have synchronized with the base unit until the time they synchronize with the base unit by receiving the next dummy data.

In the case where a call has arrived from the public telephone network or a door-phone during a talk between the portable units PS1 and PS2, the base unit CS informs the portable unit PS3 of the connection request by using the low-speed attached channel SACCH in the physical slot for communication for entering the dummy data.

In this manner, the base unit CS can synchronize the time slots of portable units PS1 and PS2 which are talking directly and bi-directionally, and inform the connection request, by using only one transmission time slot T3.

At this point, as shown in FIG. 9A, a case will be considered that the base unit CS uses the control carrier fc at the transmission time slot T1 of the period S21 and the reception time slot R1 of the period S25.

In this case, a transmission time slot T2 at which transmission is not performed exists between the transmission time slot T1 of the period S21 and the transmission time slot T3 of the period S23 of the base unit CS. Besides, a transmission time slot T4 at which transmission is not performed exists between the transmission time slot T3 and the reception time slot R1 of the period S25. Besides, the reception time slots R2, R3, and R4 at which reception is not performed and the transmission time slots T1 and T2 at which transmission is not performed exist between the reception time slot R1 and the transmission time slot T3 of the period S31.

So, the base unit CS switches the oscillation frequency of the frequency synthesizer 22 at the time slots of the aforementioned so-called free periods at which transmission or reception is not performed.

In fact, dozens of [μs] is enough to stabilize the oscillation frequency of microseconds the frequency synthesizer 22 into the frequency fc or ft after it has been switched.

Therefore, the base unit CS can switch the oscillation frequency of the frequency synthesizer 22 to stabilize the frequency within 625 [μs], that is, at least the period of one free time slot which exists between the time slots which use the different frequencies, and then can await the start of the time slot which uses the switched frequency, leaving a margin.

Accordingly, the base unit CS can transmit and receive the control data, by using the control carrier of the frequency fc generated by switching the oscillation frequency of the frequency synthesizer 22, even in such a state where the portable units PS1 and PS2 communicate each other directly and bi-directionally. As a result, the other portable unit PS3 of reception waiting state excepting the portable units PS1 and PS2 which are talking to each other can receive the down control data which is supplied using the control carrier from the base unit CS, and so the portable unit PS3 is laid within the speakable zone.

Besides, since the control data can be transmitted and received by the control carrier even in such a state where the dummy data is being transmitted to the portable units PS1 and PS2 which are mutually talking directly and bi-directionally, when a connection request has occurred which is based on outside line communication, extension communication, a door phone, etc., the base unit CS can easily inform the other portable unit PS3 in a reception waiting state that the connection request has occurred. Besides, the base unit CS is required to merely switch the oscillation frequency of the single frequency synthesizer 22, at the time of obtaining the control carrier and the communication carrier. In this way, the constitution of the wireless section 14 can be further simplified.

According to the above constitution, the dummy data which includes the synchronous information is transmitted from the base unit CS through the communication carrier of the frequency ft, and the two portable units PS1 and PS receive the dummy data. The portable units PS1 and PS2 synchronize the time slots with the time slot of the base unit CS on the basis of the synchronous information and then perform a direct talk bi-directionally. The base unit CS can ensure the plural free time slots which are to be allocated for switching of the oscillation frequency of the frequency synthesizer 22 and for transmitting/receiving the control data by using the control carrier of the frequency fc, in addition to the time slot for transmitting the dummy data through the communication carrier of the frequency ft.

Therefore, a wireless section of the base unit CS can be constituted further simply, wherein the wireless section is adapted to inform the portable units PS1 and PS2 of a connection request through the communication carrier of the frequency ft, and to transmit/receive the control data to/from the portable unit PS3 in a reception waiting state through the control carrier of the frequency fc, during a talk between the portable units PS1 and PS2.

Note that, in the aforementioned embodiment, when the base unit CS transmits dummy data by using the communication carrier of the frequency ft, the dummy data is transmitted at the transmission time slot T3 of the periods S23 and S31, however, the present invention is not limited thereto and the base unit CS can transmit the dummy data by using the communication carrier for a direct talk between portable units which has been assigned to the talking portable units, at the transmission time slot T4 of the period S24 shown in FIG. 9A. The similar effects as described above can be obtained in this case, too.

In this connection, in this case, the base unit transmits the down control data by using the control carrier of the frequency fc at the transmission time slot T2 of the period S22, and receives the up control data by using the control carrier of the frequency fc at the reception time slot R2 of the period S26.

Further, while in the aforementioned embodiment, one pair of talking portable units PS exists, which receive the dummy data transmitted from the base unit CS so as to synchronize with the base unit CS, however, the present invention is not limited thereto and plural pairs of talking portable units can exist, which receive the dummy data so as to synchronize with the base unit.

Further, while in the aforementioned embodiment, the calling-side and called-side portable units PS concurrently receive the dummy data transmitted from the base unit CS so as to synchronize with the base unit CS, however, the present invention is not limited thereto and can be applied to a case that one side of the mobile wireless terminals receives the dummy data and synchronizes with the base station in advance, and then the other side of the mobile wireless terminals can synchronize with the base station by stated data transmitted from the previously-synchronized mobile wireless terminal.

Further, while in the aforementioned embodiment, the communication is performed in accordance with the PHS scheme, however, the present invention is not limited thereto and can be applied widely to a wireless telephone system wherein the communication is performed in accordance with the TDMA scheme, and plural portable units are registered at the base unit which is connected to the public telephone network, and used.

Furthermore, while in the aforementioned embodiment, the transmission and reception is performed on the basis of setting of the time slots having the constant period and the physical slots having the constant number of bits, however, the present invention is not limit thereto and so long as the base station ensures the free periods which isolate the first period from the second period which use the different frequencies each other, and the base station switches the oscillation frequency of the frequency-selecting oscillators during the free periods and stabilizes the frequencies, the duration of transmission and reception of the wireless telephone system and the number of bits which are transmitted and received during the duration can be constituted arbitrarily.

As described above, according to the present invention, a wireless telephone system can be realized, wherein the synchronous information is transmitted from the base station through the first frequency, and the first and the second mobile wireless terminals which have received the synchronous information communicate directly and bi-directionally in a synchronized manner with the base station on the basis of the synchronous information, in this way, the base station can ensure a free period which is allocated to switching of the oscillation frequency of the frequency-selecting oscillator, and to transmission and reception of the control data using the second frequency, in addition to the period for transmitting the synchronous information through the first frequency. Accordingly, it is able to further simplify the wireless section of the base station for informing the talking mobile wireless terminals of a connection request through the first frequency while the mobile wireless terminals are talking, and for transmitting/receiving the control data to mobile wireless terminals which are in a reception waiting state through the second frequency.

While there has been described in connection with the preferred embodiments of the invention, it will be obvious to those skilled in the art that various changes and modifications may be made, therefore, it is intended to cover in the appended claims all such changes and modifications as fall within the true spirit and scope of the invention.

What is claimed is:

1. A wireless telephone system using time division multiple access, said system including a base station connected to a public telephone network and a plurality of mobile wireless terminals for communicating with the base station, said system being for communicating stated data between terminals of said plurality of mobile wireless terminals, wherein said plurality of mobile wireless terminals include a first wireless mobile terminal and a second wireless mobile terminal and a bi-directional communication is performed between said first wireless mobile terminal and said second wireless mobile terminal, wherein said base station includes means for transmitting synchronous information at a first period to said first and second mobile wireless terminals and said base station causes said first and second mobile wireless terminals to synchronize with said station on the basis of the transmitted synchronous information, a frequency generator, and means for transmitting and for receiving control data at a second period and a third period, respectively, that are not adjacent to each other or to said first period for providing a time for a first and a second carrier frequency generated by said frequency generator to be switched, whereby said synchronous information is transmitted using said first carrier frequency and said control data is transmitted using said second carrier frequency, said first mobile wireless terminal includes means for directly transmitting said first data to said second mobile wireless terminal, and said second mobile wireless terminal includes means for directly transmitting second data to said first mobile wireless terminal.

2. The wireless telephone system according to claim 1, wherein said first mobile wireless terminal transmits said first data at a fourth period that is not adjacent to said first period, and said second mobile wireless terminal transmits said second data at a fifth period that is not adjacent to said first and fourth periods.

3. The wireless telephone system according to claim 1, wherein said synchronous information and said first and second data are transmitted and received at a timing of a time slot that has been set for each stated period.

4. The wireless telephone system according to claim 1, wherein said first and second mobile wireless terminals concurrently receive said synchronous information from said base station so as to synchronize with said base station.

5. The wireless telephone system according to claim 1, wherein said second mobile wireless terminal includes means for receiving said synchronous information so as to synchronize with said base station, transmitting said second data to said first mobile wireless terminal after synchronizing, and causing said first mobile wireless terminal to synchronize with said base station on the basis of the second data.

6. The wireless telephone system according to claim 1, wherein said first mobile wireless terminal includes means for receiving said synchronous information so as to synchronize with said base station, transmitting said first data to said second mobile wireless terminal after synchronizing, and causing said second mobile wireless terminal to synchronize with said base station on the basis of the first data.

* * * * *